United States Patent [19]

Parkes et al.

[11] Patent Number: 5,778,648
[45] Date of Patent: Jul. 14, 1998

[54] LAWN MOWER CLIPPING COLLECTION SYSTEM

[75] Inventors: Donald H. Parkes, Lamoni; Scott A. Schick, Corydon, both of Iowa

[73] Assignee: Shivvers, Inc., Corydon, Iowa

[21] Appl. No.: 707,772

[22] Filed: Sep. 4, 1996

[51] Int. Cl.$^6$ .................................................. A01D 34/70
[52] U.S. Cl. ............................. 56/202; 56/13.3; 56/16.6
[58] Field of Search .......................... 56/202, 16.6, 16.7, 56/13.3, 13.4, 199, 200, 203, 204, 205

[56] References Cited

U.S. PATENT DOCUMENTS

| | | |
|---|---|---|
| 3,987,606 | 10/1976 | Evans . |
| 4,310,998 | 1/1982 | Cuba . |
| 4,345,416 | 8/1982 | Cameron . |
| 4,433,532 | 2/1984 | McCunn . |
| 4,476,668 | 10/1984 | Reilly . |
| 4,709,541 | 12/1987 | Broman et al. . |
| 4,741,148 | 5/1988 | Ekas, Sr. et al. . |
| 4,819,417 | 4/1989 | Bryant et al. . |
| 4,922,696 | 5/1990 | Burns et al. ............... 56/205 X |
| 4,924,664 | 5/1990 | Hicks . |
| 4,945,716 | 8/1990 | Murakawa et al. . |
| 5,018,344 | 5/1991 | Samejima et al. . |
| 5,018,346 | 5/1991 | Ishimaru et al. ............. 56/205 X |
| 5,195,310 | 3/1993 | Kettler et al. ............... 56/203 X |
| 5,307,613 | 5/1994 | Delery . |
| 5,465,564 | 11/1995 | Koehn et al. . |

*Primary Examiner*—Terry Lee Melius
*Attorney, Agent, or Firm*—Litman, McMahon & Brown, LLC

[57] ABSTRACT

A mower clipping collection system for a riding mower comprises a collector housing having an interior collection chamber and having an interior cylindrical wall forming a cylindrical separation chamber positioned above and in communication with the collection chamber. A clipping transfer conduit extends from the mower deck and is mounted tangentially with respect to the cylindrical wall of the collector housing such that mower clippings, entrained in a stream of air exiting the mower, are blown tangentially into the separation chamber through an opening in the cylindrical wall. The collector housing includes a floor which slopes downward to a clipping dump opening extending across a rear side of the housing. A door is pivotally mounted to the collector housing across the clipping dump opening and moveable in and out of covering relationship therewith by a door operating assembly engageable by an operator while seated on the mower. A blower, that is selectively engageable by the operator while seated on the mower, is connected to the clipping transfer conduit to facilitate the transfer of clippings. An exhaust duct is connected to the collector housing and extends from an exhaust opening therein to a downwardly directed exhaust duct outlet near ground level.

20 Claims, 4 Drawing Sheets

LAWN MOWER CLIPPING COLLECTION SYSTEM

BACKGROUND OF THE INVENTION

The present invention relates to grass clipping collection systems for lawn mowers.

Various collection systems comprising a collector which can be mounted on the rear of a riding mower have been developed to facilitate the collection of mower generated debris including grass clippings. Such systems generally include a blower or vacuum system that draws clippings from a discharge port in the mower deck to the collector.

Assemblies which permit the user to dump the contents of the collector from the driver's seat are popular for use in riding mower collection systems. Such systems generally utilize a relatively rigid collection container or hopper having a horizontal cross-section which is generally rectangular. In such systems a manually operable linkage assembly having one end positioned proximate the seat of the mower is often incorporated to allow a user to dump the contents of the collector through rotation of the collector or by opening a door to the collector or both.

A prior art device produced by The Grasshopper Company of Moundridge, Kans. includes a lever activated hopper for such a collection system in which the bottom of the hopper is sloped downwardly and rearwardly. The slope of the bottom of the hopper is sufficient to allow the contents of the hopper to fall out when a door extending across the rear of the collector is opened through activation of the manually operable linkage.

In the Grasshopper device the air which is blown into the hopper by the blower is vented generally out the top of the hopper through a screen and directed rearwardly by deflectors. The rectangular cross-section of the hopper and design of the air inlet in the hopper result in poor air flow characteristics in the hopper, such that a significant quantity of clippings remain entrained in the air in the hopper and clog the screen. Clogging of the screen, increases back pressure and reduces the air flow through the system which adversely affects the delivery of grass clippings from the mower to the collector.

U.S. Pat. No. 4,819,417 to Bryant et al. discloses a collection system which utilizes a cyclonic action to separate clippings from the air flowing through the collector, thereby reducing clogging of a vent screen and maintaining adequate air flow through the system. The collector is cylindrical along its length. Incoming air laden with clippings is directed tangentially into an upper portion of the collector causing the air to flow downward in a spiral around the outer periphery of the collector. Clippings entrained in the air stream are thrown against the sides of the container, by centrifugal forces, causing the clippings to drop out of the air stream and fall toward the bottom of the collector. As the air stream hits the floor of the container or the upper level of collected clippings, the air is deflected upward through the center of the vortex and out an opening in the top of the collector. A screen extends across the opening in the top of the collector to catch additional clippings remaining in the air stream exiting the collector.

Although cyclonic type separators generally provide better separation efficiency and, therefore, better air flow through the system, the cylindrical design of such collectors is not conducive to inclusion of a rear door to permit an operator to dump the collector from the operator's seat. In the collector disclosed in the Bryant et al. patent, an operator must dismount the mower and manually remove the lower portion of the collector (a standard trash can) from a support structure to dump the contents.

An additional problem with use of cyclonic type separators in clipping collection systems, is that dust and relatively small clippings which pass through the screen are directed into the air creating a dust and particle cloud generally at the level of the mower operator's head and through which the operator continually passes while mowing back and forth in the mowing pattern. This problem is exacerbated by winds that blow the dust clouds toward the operator. Although deflectors have been used to direct the air stream rearward, as shown in Bryant et al., the air stream is normally discharged generally at head level of the operator. Systems that discharge lower do not suggest a system that is easily combined with the other desired elements of such a collector.

One further problem with collectors that are used with lawn mowers is that the blower or vacuum system normally requires a relatively powerful motor that often is an independent device that is expensive and subject to frequent repair. Consequently it is desirable to also have a blower system that is operated by the power take off available on many tractors and to be able to engage or disengage the blower system without the operator leaving the driver's seat. There is a need for an improved collection system for riding mowers which provides for effective collection and separation of clippings and which permits a mower operator to readily dump the contents of the collection system and operate the blower from the operator's seat.

SUMMARY OF THE INVENTION

The present invention comprises a mower clipping collection system for a riding mower. The collection system includes a collector housing having an upper cylindrical separation chamber formed therein that is positioned above and opening into a lower collection chamber formed therein.

The cylindrical separation chamber is generally defined by a cylindrical wall. Mower clippings, entrained in a stream of air, are blown by a blower tangentially into the separation chamber. The clippings are blown through an opening in the cylindrical wall via a clipping transfer conduit which extends from the mower deck and is mounted tangentially with respect to the cylindrical wall of the collector housing. The mower clippings are blown by a blower operably connected to the transfer conduit so as to tangentially engage the separation chamber, such that the air and the clippings entrained therein travel around the cylindrical wall creating a vortex or cyclone effect with the air circling downward near the wall and then upwardly in the center of the separation chamber. The cyclone effect effectively causes the clippings to drop out of the rotating air stream and fall toward the bottom of the collection chamber.

A door is connected to the collector housing and is selectively moveable between covering and non-covering relationship with a clipping discharge opening which is located in the side of the collection chamber. The collector preferably includes a downwardly sloping floor. The clipping discharge opening joins with and extends upward from a lower end of the downwardly sloping floor. The door is preferably pivotally connected to the collector housing generally along an upper edge of the clipping discharge opening. A lever, having an operating handle positioned proximate a mower seat, is connected to the door such that the door may be advanced in and out of closing relationship with respect to the clipping discharge opening by an operator sitting in the mower seat.

The blower includes an impeller and an impeller drive assembly which is removably connectable to a power take off shaft on the mower. A clutch, including a clutch engagement handle positioned proximate the mower seat, is selectively engageable by an operator sitting in the mower seat for engaging the impeller drive assembly to drive the blower impeller.

The mower clipping collection system also preferably includes an exhaust duct connected to the collector housing in flow communication with an exhaust opening in the collector housing and having a downwardly directed exhaust duct outlet for discharging exhaust from the collector housing in a downward direction and near the ground level.

OBJECTS AND ADVANTAGES OF THE INVENTION

Therefore the objects and advantages of the present invention include: to provide a mower clipping collection system for riding mowers which is effective in separating and collecting a substantial quantity of clippings entrained in a stream of air discharged from a mower and which permits the clippings collected by the mower clipping collection system to be readily dumped from the collector by a mower operator while remaining seated on the mower; to provide such a system which utilizes a cyclonic action to separate clippings from the air stream in which the clippings are entrained; to provide such a system in which exhaust air from the system is directed downward and exhaust near ground level; to provide such a system wherein a cyclonic separator is utilized in conjunction with a rear discharge system that is operable from the driver's seat and a lower exhaust discharge; and to provide such a system which utilizes a blower, selectively engageable by an operator on the mower seat, to blow clippings from the mower deck to a collector housing.

It is also an object of the present invention to provide such a system including a collector housing which defines a collection chamber and includes a cylindrical wall defining a cylindrical separation chamber extending above the collection chamber; to provide such a system having a clipping discharge opening in said collector housing which extends into the collection chamber; to provide such a system having a door which is selectively advanceable in and out of a closing relationship with the clipping discharge opening by an operator seated on the mower; to provide such a system in which the air stream with clippings entrained therein is introduced into the separation chamber via a clipping transfer conduit extending between the mower deck and the collection housing and which is connected to the housing tangentially to the cylindrical wall such that air and clippings blown through the conduit enter the cylindrical separation chamber tangentially creating a cyclone effect; to provide such a system utilizing a blower to blow clippings from the mower deck to the collection housing; to provide such a system in which the blower incorporates a drive assembly removably connectable to the riding mower power take off shaft and which is selectively engageable by a clutch to drive a blower impeller; to provide such a system in which the clutch is engageable from an operator seated on the mower; to provide such a system in which air exhausted from the collection housing is directed in a downward direction by an exhaust duct; and to provide such a system which is particularly well adapted for the intended use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally refers to a mower clipping collection system for a riding mower 2. The mower 2 includes a self propelled mower frame 3 having a self contained engine 4, a mower seat 5 and a mower cutting deck 6 mounted thereto. Mower blades (not shown) are enclosed in the mower cutting deck 6. Directional references herein are made with reference to an operator seated on the mower seat 5 such that the right side of the mower 2 corresponds with the right hand side of the operator seated thereon.

Figure 2:
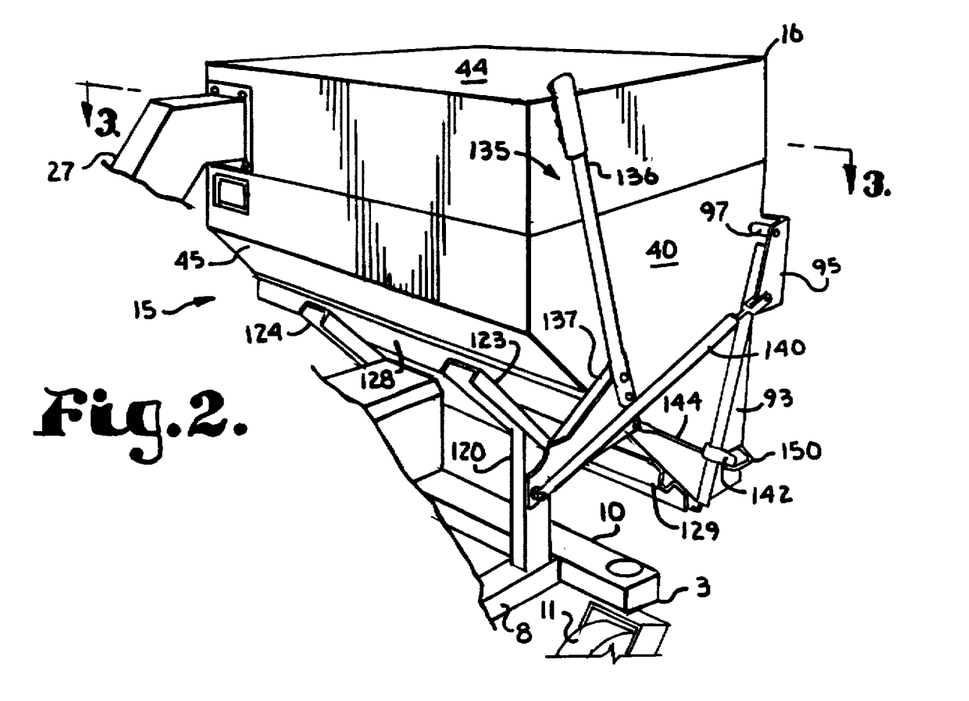
FIG. 2 is an enlarged and fragmentary perspective view of the clipping collection system.
Figure 3:
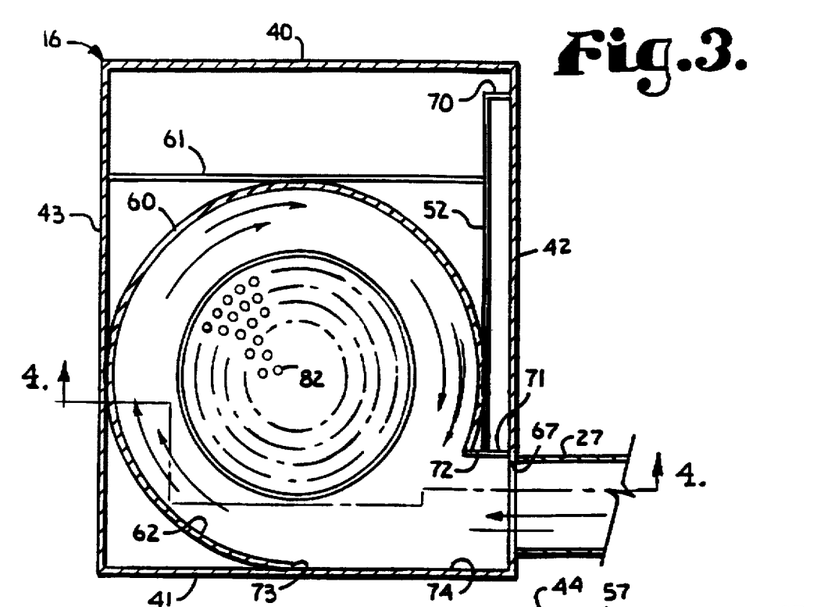
FIG. 3 is an enlarged, fragmentary, cross-sectional view of the clipping collection system, taken generally along line 3—3 of FIG. 2.
Figures 4, 5:
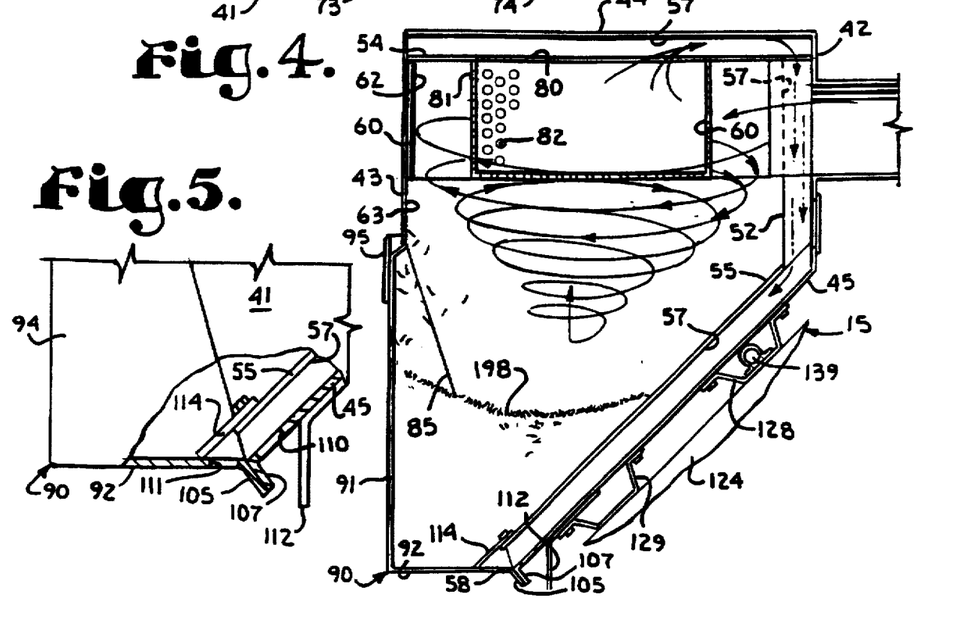
FIG. 4 is a fragmentary, cross-sectional view of the clipping collection system, taken generally along line 4—4 of FIG. 3.
FIG. 5 is an enlarged and fragmentary side elevational view of the clipping collection system with portions broken away to show detail.
Figures 8, 9:
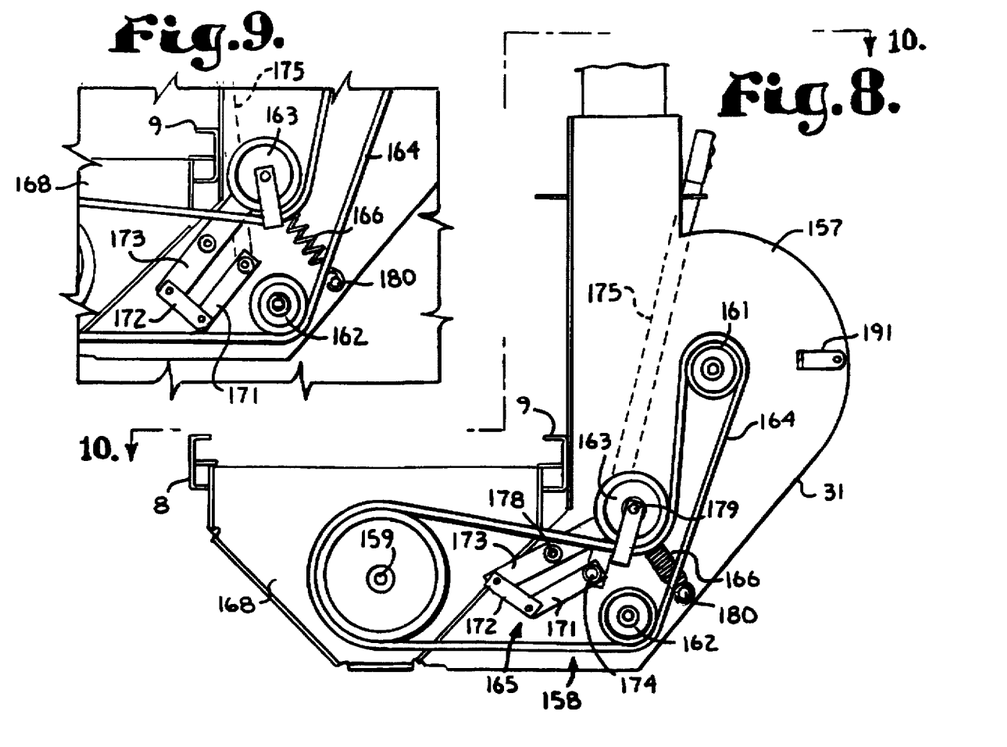
FIG. 8 is an enlarged and fragmentary rear elevational view showing a blower and a blower clutch assembly of the collection system with the clutch in an engaged configuration.
FIG. 9 is an enlarged and fragmentary view of the blower and clutch assembly similar to FIG. 8, showing the clutch in a disengaged configuration.
Figure 10:
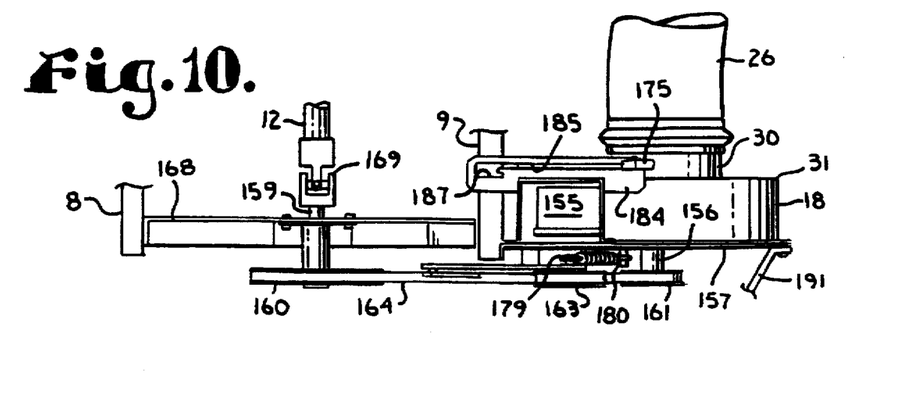
FIG. 10 is an enlarged and fragmentary view of the blower and the blower clutch assembly, taken generally along line 10—10 of FIG. 8.

The mower frame 3 includes left and right side rails 8 and 9 (FIGS. 2 and 8) fixedly joined perpendicularly to a rear cross beam 10 to which caster wheels 11 are swivelly mounted. A power take off shaft 12 extends rearwardly from and is driven by the mower engine 4. The power take off shaft 12 extends centrally between the side rails 8 and 9. The mower 2 also includes drive wheels 13 and mower deck support wheels 14.

The mower clipping collection system 1 comprises a support frame 15, a hopper or collector housing 16, a clipping transfer conduit 17, a blower 18 and a deck clipping chute 19. The collector housing 16 and the blower 18 are mounted on the support frame 15 which is removably securable to the mower frame 3 behind the mower seat 5.

The deck chute 19 is removably securable to the deck 6 along a conventional side discharge opening in the deck (not shown). The deck chute 19 is secured to the deck by a quick release coupling well known in the industry and which is not described in detail herein. A transition discharge tube 23, having a mower discharge opening (not shown) extending therethrough, extends rearwardly from and flow connects with the deck chute 19.

The clipping transfer conduit 17, comprises a blower intake conduit 26, preferably constructed of flexible tubing, and a blower discharge conduit 27, preferably comprising a rectangular conduit formed from sheet metal or other rigid materials each flow connected with each other and with the chute 19 through the tube 23. The blower intake conduit 26 is connected at one end to the transition discharge tube 23 and at an opposite end to a blower intake collar 30 centrally mounted on a blower housing 31. The blower discharge conduit 27 extends from a discharge of the blower 18 to the collector housing 16.

The collector housing 16 comprises first and second or left and right opposed side panels 40 and 41, front panel 42 extending across what is referred to as the front of the collector housing 16, rear panel 43 extending across what is referred to as the rear of the collector housing 16, top panel 44 and a downwardly sloping bottom panel 45. The floor extends between side panels 40 and 41 and slopes downward from the front of the collector housing 16 to the rear thereof.

A false front panel 52 is positioned in parallel and spaced relation behind the front panel 42. A false top panel 54 is positioned in parallel and spaced relation below the top panel 44. A false bottom panel or hopper bottom 55 is positioned in parallel and spaced relation above the bottom panel 45. The false front panel 52 extends between the false top panel 54 and the false bottom panel 55. The space between the top panel 44 and the false top panel 54 opens into the space between the front panel 42 and the false front panel 52 which opens into the space between the bottom panel 45 and the false bottom panel 55 to generally define and form an exhaust duct 57 extending therebetween from the top of the collector housing, down the front, and along the bottom thereof to a lower end of the collector housing 16 so as to open to the ambient surroundings at downwardly opening discharge port 58.

A cylindrical wall or baffle 60 is mounted within the collector housing 16 so as to extend below the false top panel 54. The baffle 60 is generally tangentially mounted to the right side panel 41, the rear panel 43, the false front panel 52, and a baffle support panel 61 which extends between the rear panel 43 and the false front panel 52 in parallel and spaced relation inward from the left side panel 40. The baffle 60 generally surrounds, forms and defines a cylindrical separation chamber 62 which extends above and opens into a collection chamber 63 formed interior of and defined by a lower portion of the collector housing 16. The separation chamber 62 is generally circular in cross-section and positioned such that during normal use the central axis of the separation chamber 62 is perpendicular to the horizontal or ground and the collection chamber 63 is generally rectangular in cross-section and vertically located directly below the separation chamber 62. It is foreseen that the collection chamber could be of various polygonal cross-sections. It is preferable that at least one of the front, rear or side panels be generally planar so as to more easily accommodate a door as discussed in more detail below.

An intake opening 67 is located in the front panel 42 toward an upper end and a right side thereof. The distal end of the blower discharge conduit 27 is mounted to the front panel 42 in enclosing relationship with the intake opening 67 and so as to flow communicate therewith. The false front panel 52 includes left and right spacing legs 70 and 71 which space the false front panel 52 from the front panel 42 and function to form walls of the exhaust duct 57 therewith. The right leg 71 abuts and extends transverse to the front panel 42 to the left of the intake opening 67. The baffle 60 generally extends from proximate the point of tangency of the baffle 60 with the right side panel 41, tangentially across the rear wall 43, tangentially across the baffle support panel 61 and tangentially across the false front panel 52 to a support extension 72 which is secured to and extends in axial alignment with the right leg 71 of the false front panel 52. A baffle opening or break 73 is thereby formed in the baffle 60 and extends from the support extension 72 to the point of tangency of the baffle 60 with the right side panel 41. An intake passageway 74 extends from the housing intake opening 67 to the opening 73 in the baffle 60. The intake passageway 74 opens into the cylindrical separation chamber 62 such that air and debris passing therethrough generally tangentially engages the separation chamber 62.

An exhaust opening 80 extends through the center of the false top panel 54 above the cylindrical separation chamber 62 centrally thereof so as to open into and flow communicates with the exhaust duct 57. A basket or screen 81 in the shape of an open topped and closed bottom cylinder, preferably formed of perforated and rigid material, is mounted to the false top panel 54 so as to extend across the exhaust opening 60 and into the cylindrical separation chamber 62. The basket 81 includes a plurality of openings, holes or perforations 82 sized to permit air to pass therethrough but to filter out grass clippings and the like entrained in the stream of air. The basket 81 surrounds the opening 80 such that the interior of the basket 81 flow communicates with the opening 80 and also through the perforations 82 with the remainder of the separation chamber 62.

A clipping dump opening 85 extends across a rear face of the collector housing 16 between left and right side panels 40 and 41 and from near a lower and rearward edge of the false bottom panel 55 upward to a location about one halfway up the rear and along a lower edge of the rear panel 43. The duct port 58 generally extends across a bottom face of the collector housing 16 between the bottom panel 45 and the false bottom panel 55.

A door 90 is pivotally or hingedly mounted to the collector housing 16 generally along the lower edge of rear panel 43 which corresponds to an upper extreme of the dump opening 85. The door 90 is pivotally advanceable in and out of covering or closing relationship with the collector dump opening 85. The door 90 includes a rear panel 91, bottom panel 92 and left and right side panels 93 and 94 which are generally triangular.

The door 90 is pivotally mounted to the collector housing 16 by left and right side door brackets 95 and 96 which are mounted to the rear panel 91 of the door 90 on the left and right sides thereof along an upper edge thereof. The left and right side door brackets 95 and 96 are then pivotally mounted to the left and right side panels 40 and 41 by hubs 97 and 98 respectively extending outward therefrom.

Figure 6:
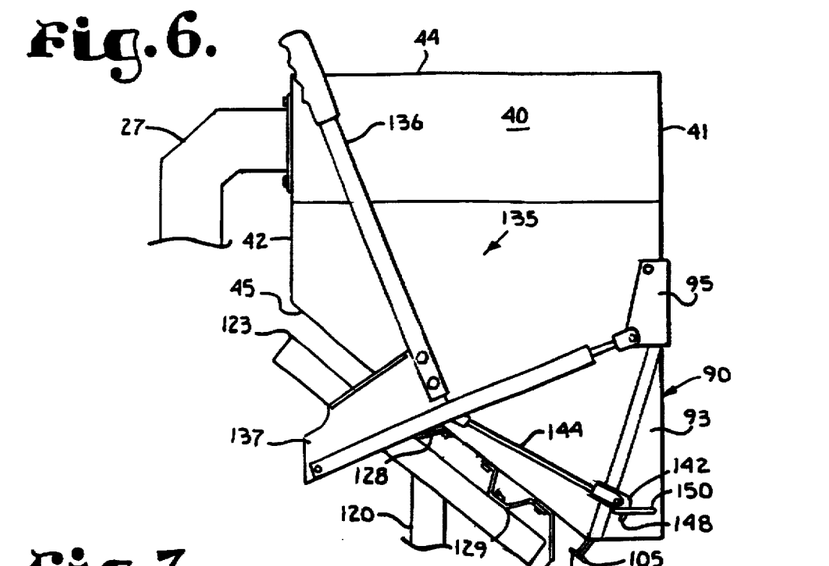
FIG. 6 is an enlarged and fragmentary left side elevational view of the clipping collection system of the present invention showing a door thereof in a closed position relative to a collector housing thereof.

When the door 90 is positioned in a closed alignment or configuration (see FIG. 6), a bottom sealing flange 105 extending across a forward edge of the bottom panel 92 of the door 90 abuts against or engages a bottom sealing flange 107 which extends across the bottom panel 45 of the collector housing 16 generally along a lower or rear edge thereof.

A first set of vent openings 110 extend in adjacent alignment across the bottom panel 45 generally along and proximate the lower edge thereof. Similarly a second set of vent openings 111 extend in adjacent alignment across the bottom panel 92 of the door 90 generally along and proximate the forward edge thereof. Openings 110 and 111 collectively form port 58. Air exiting through the exhaust opening 80 and traveling through the exhaust duct 57 passes out of the duct 57 and the collector housing 16 through the first and second set of vent openings 110 and 111. A deflector plate 112 is secured to and extends across an outer surface of the bottom panel 45 on a side of said first set of vent openings 110 opposite the bottom sealing flange 107. The deflector plate deflects air discharged through the first set of vent openings 110 downward at a location relatively close to the ground.

Figure 7:
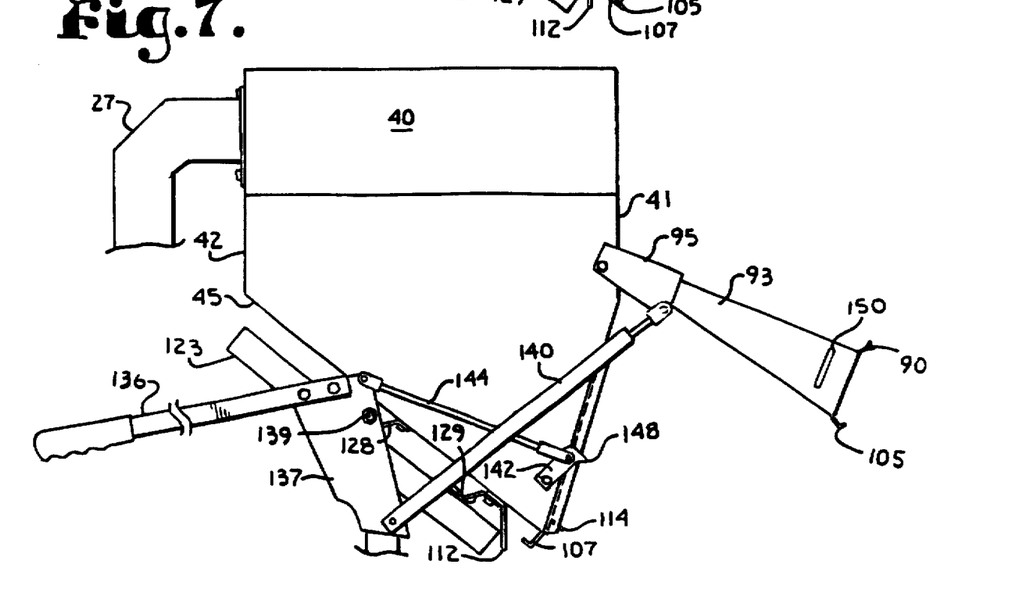
FIG. 7 is a view of the clipping collection system similar to that shown in FIG. 6 showing the door in an open position relative to the collector housing.

A sealing flap 114 is secured to and extends across the lower or rear edge of the false bottom panel 55. When the door 90 is advanced to the closed configuration (see FIG. 6) from the open configuration (see FIG. 7), the sealing flap 114 engages the bottom panel 92 of the door 90 on a side of the second set of vent openings 111 opposite the bottom sealing flange 105 and helps to prevent air blown through the duct 57 from blowing back into the collection chamber 63 once in the closed configuration.

The support frame 15 comprises left and right side standards 120 and 121 which are removably secured by bolts to the left and right side rails 8 and 9 respectively of the mower frame 3 proximate the rear ends thereof and behind the seat 5. Left and right side angled supports 123 and 124 are secured to the left and right side standards 120 and 121 and slope or angle rearwardly and downwardly relative to the mower 2. Additional bracing may be provided to more securely support the hopper 16.

Upper and lower hopper braces 128 and 129 are secured to and extend across the lower surface of the hopper bottom panel 45. The upper and lower hopper braces 128 and 129 have a generally trapezoidal shape and include a channel extending thereacross and facing the hopper bottom panel 45. The upper and lower hopper braces 128 and 129 extend across and are bolted to the left and right side angled supports 123 and 124 of the frame 15.

The collection system 1 further includes a door operating assembly 135, of the type generally referred to as an over-center mechanism, which is operable to open and close the door 90 relative to the hopper 16. The door operating assembly 120 comprises a dump handle 136, left and right side pivot brackets 137 and 138, pivot rod 139, left and right side door opening rods 140 and 141, left and right side latches 142 and 143 and left and right side latch linkages 144 and 145.

The dump handle 136 is fixedly connected at a lower end to a rear end of the left side pivot bracket 137. The left side pivot bracket 137 is connected to the right side pivot bracket 138 by the pivot rod 139 which is rotatably mounted to the upper hopper brace 128 in the channel thereof. The front ends of the left and right side door opening rods 140 and 141 are pivotally connected to the front ends of the left and right side pivot brackets 137 and 138 respectively. The rods 140 and 141 are pivotally connected at their rear or opposite ends to the left and right side door brackets 95 and 96.

The left and right side latches 142 and 143 are pivotally mounted at their front ends to the left and right side panels 40 and 41 of the hopper 16 proximate the bottom rear corners thereof. The front ends of the left and right side latch linkages 144 and 145 are pivotally connected to the rear ends of the pivot brackets 137 and 138 respectively. The latch linkages 144 and 145 are pivotally connected at their rear or opposite ends to the distal ends of the latches 142 and 143 respectively.

When the door 90 is in a closed alignment or position, the dump handle 136 extends in a generally upright and slightly forwardly angled alignment. In this alignment, latch fingers 148 on the left and right side latches 142 and 143 respectively, extend through left and right side hoops or bails 150 and 151 respectively which are mounted on the left and right side panels 93 and 94 respectively of the door 90, to prevent the door 90 from opening.

The dump handle 136 extends to a position where it is accessible to an operator seated on the mower seat 5 such that the operator can manipulate the handle without having to dismount from the seat 5. When the dump handle 136 is pulled forward, the left and right side pivot brackets 137 and 138 pivot about the pivot rod 139 such that the rear end of each pivot bracket 137 and 138 rotates upwardly and forwardly and the front end of each pivot bracket 137 and 138 rotates downwardly and rearwardly. Upward and forward rotation of the front end of each pivot bracket 137 and 138 pulls the left and right side latch linkages 144 and 145 upwardly and forwardly causing the distal ends of the left and right side latches 142 and 143 to pivot upward and forwardly thereby pulling the latch fingers 148 out of engagement with the latch bails 150 and 151. Downward and rearward rotation of the front end of each pivot bracket 137 and 138 drives the front end of each of the left and right side door opening rods 140 and 141 downwardly and rearwardly thereby driving the rear end of door opening rods 140 and 141 rearwardly and upwardly thereby driving or pivoting the door 90 rearwardly and upwardly into an open alignment with respect to the hopper 16.

When the dump handle 136 is pushed rearward, the left and right side pivot brackets 137 and 138 pivot about the pivot rod 139 such that the front end of each pivot bracket 137 and 138 rotates upwardly and forwardly and the rear end of each pivot bracket 137 and 138 rotates downwardly and rearwardly. Upward and forward rotation of the front end of each pivot bracket 137 and 138 pulls the front end of each of the left and right side door opening rods 140 and 141 downwardly and forwardly thereby pulling the rear end of each of the door opening rods 140 and 141 and the door 90 downwardly and forwardly into the closed configuration with respect to the hopper 16. Downward and rearward rotation of the front end of each pivot bracket 137 and 138 drives the left and right side latch linkages 144 and 145 downward and rearward causing the distal ends of the left and right side latches 142 and 143 to pivot downward and rearward thereby advancing the latch fingers 148 and 149 into engagement with the latch bails 150 and 151 for securing the door 90 in the closed configuration.

The blower 18 is a centrifugal blower having an impeller 155 mounted within the blower housing 31 on an impeller shaft 156 which is rotatably mounted to a rear panel 157 of the blower housing 31 on bearings (not shown). The impeller shaft 156, and therefor the impeller 155, is rotatably driven by an impeller drive assembly 158 which is selectively connectable to the power take off shaft 12 of the mower 2.

The impeller drive assembly 158 generally comprises a connecting shaft 159, a main drive pulley 160, impeller drive pulley 161, idler pulley 162, clutch pulley 163, drive belt 164, clutch linkage assembly 165 and clutch spring 166. The connecting shaft 159 extends through and is rotatably mounted to a support panel 168 secured to and extending between and below the side rails 8 and 9. The connecting shaft 159 is supported by the support panel 168 so as to be in axial alignment with the power take off shaft 12 such that the connecting shaft 159 is removably securable to the power take off shaft 12 by universal joint 169.

The main drive pulley 160 is secured to the connecting shaft 159 on a side of the support panel 168 opposite the power take off shaft 12. The impeller drive pulley 161 is connected to the main drive pulley 160 by the drive belt 164. The idler pulley 162 is rotatably mounted to the blower housing 31 generally at a lower end thereof. The drive belt 164 extends partially around the idler pulley 162, generally around an outer or lower portion of the periphery thereof. The clutch pulley 163 is rotatably mounted to the clutch linkage assembly 165 in spaced relationship above the idler pulley 162. The drive belt 164 extends partially around the clutch pulley 163 around an inner or lower portion of the periphery thereof.

The clutch linkage assembly 165 generally comprises a first pivot arm 171, a cross link 172 and a second pivot arm 173. The first pivot arm 171 is fixedly connected at one end to a blower shift rod 174 which is rotatably mounted to and extends through the blower housing 31 below the impeller 155. The blower shift rod 174 is connected at a second end to a blower handle 175 at a lower end thereof. The blower handle 175 is connected to the blower shift rod 174 generally in front of the blower housing 31 and extends upward such that an upper end or gripping portion 176 of the handle 175 is positioned proximate the mower seat 5 and such that an operator may reach and manipulate the handle 175 while seated. The first pivot arm 171 is pivotally connected at a second end to a first end of the cross link 172. The cross link 172 is pivotally connected at a second end to the second pivot arm 173 at a first end thereof. The second pivot arm is rotatably mounted, medially thereof, to a mounting pin 178 which is generally mounted to the rear panel 157 of the blower housing 31. The clutch pulley 163 is rotatably mounted on a mounting pin, bolt or screw 179 on the second pivot arm 173 at a second end thereof.

The clutch spring 166 is a coil type extension spring and is mounted at one end to the clutch pulley mounting pin 179 and at a second end to a spring mounting pin, bolt or screw 180. The spring mounting bolt 180 is secured to and extends rearwardly from the rear panel 157 of the blower housing 31 below and to the right of the clutch pulley 163. The clutch spring 166 biasingly pulls the clutch pulley 163 downward and to the right to take up slack in the drive belt 164, such that the main drive pulley 160 engages the drive belt 164 which then drives the impeller drive pulley 161 and the impeller 155 connected thereto.

The blower handle 175 is used to shut off the blower 18 by advancing the clutch pulley 163 out of engagement with the drive belt 164 so as to create slack in the drive belt 164 and such that the main drive pulley 160 does not drivingly engage the drive belt 164 and further such that the drive belt 164 does not rotate the impeller 155. A blower handle guide plate 184, having a guide slot 185 formed therein, is mounted on a front panel 186 of the blower housing 31 toward an upper end thereof. A catch slot 187 extends rearwardly from the guide slot 184 on the left end thereof. The blower handle 175 extends through the guide slot 185.

Rotation of the blower handle 175 from right to left, rotates the clutch pulley 163, via clutch linkage assembly 165, upwardly and to the left and out of engagement with the drive belt 164 against the biasing force of the clutch spring 166. The clutch pulley 163 may be maintained in a disengaged relationship with the drive belt 164, by advancing the blower handle 175 into the catch slot 187 and thereby preventing the blower handle 175 from being pulled back to the right by the biasing force of clutch spring 166.

The rear panel 157 of the blower housing 31 is secured to the right side rail 9 and the support panel 168 by bolting or the like. A blower brace 191 is removably secured to and extends between the rear panel 157 of the blower housing 31 on a right side thereof and the right side standard 121 of the support frame 15.

Figure 1:
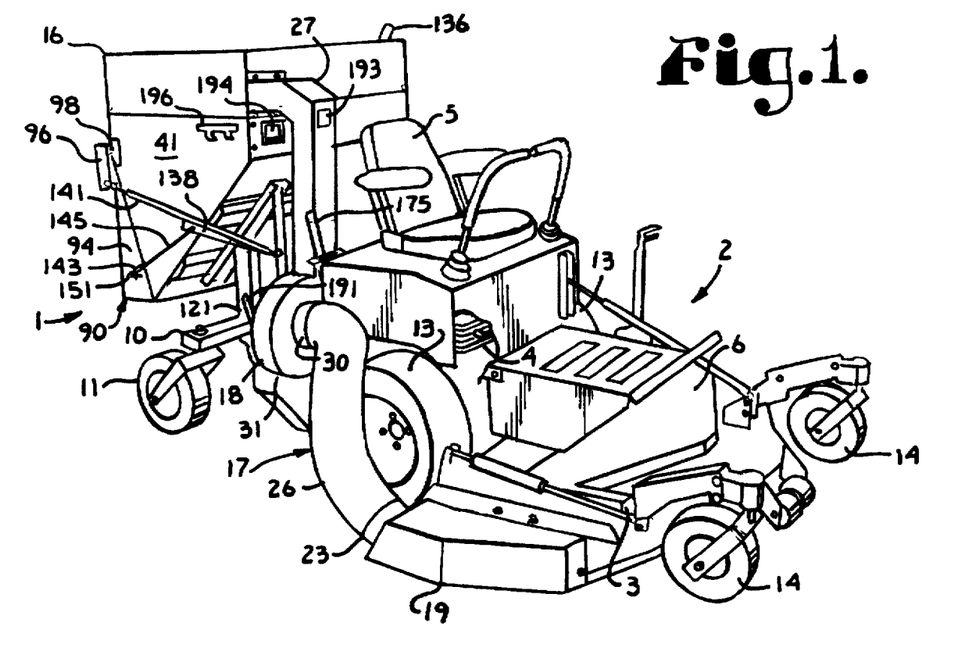
FIG. 1 is a perspective view of a riding mower with a clipping collection system in accordance with the present invention.

A first window 193 (FIG. 1) is positioned on a front surface of the blower discharge conduit 27 at an upper end thereof. The window 193 enables an operator to visually determine, from the seat 5, when the blower discharge conduit 27 has become clogged. A second window 194 is positioned on the front panel 42 below the intake opening 67. The second window 194 permits an operator to visually determine from the seat 5 when the hopper 16 becomes full.

A set of hooks 196 is mounted on an outer surface of the right side panel 41. The hooks 186 are adapted to receive and support the chute 19 when it is removed from the mower deck 6 in situations where the operator does not want to collect the mower clippings.

In use, when the clipping collection system 1 is to be used to collect clippings, the chute 19 is connected to the mower deck 6 across the mower deck side discharge opening 20. After the mower engine 4 is started, the blower handle 175, is removed from the catch slot 187 in the blower handle guide plate 184, such that the clutch spring 166 advances the handle 175 to the right causing the clutch pulley 163 to engage the drive belt 174 which drives the blower impeller 155.

With the blower 18 engaged, as the mower 2 is operated, clippings 198 are blown, in a stream of air produced by the high speed rotation of the blades, out of the mower deck 6 through the mower deck side discharge opening 20. The clippings 198 are blown into the deck transition 19, through the transition discharge tube 23 and into the blower intake conduit 26. The suction from the blower 18 simultaneously draws the clippings 198 through the blower intake conduit 26 and into the blower housing 31. The clippings 198, generally entrained in the stream of air, are blown out of the blower 18 by the impeller 155, through the blower discharge conduit 27, through the intake opening 67 and the intake passageway 74 and near tangentially into the separation chamber 62.

The substantially tangential introduction of the stream of air with the clippings 198 entrained therein into the separation chamber 162, causes the stream of air to rotate around the separation chamber 162 creating a vortex cyclone type action. It is believed that the stream of air rotates downward below the separation chamber 162 and into the collection chamber 163. As the stream of air rotates, the centrifugal force urges the clippings 198 outward and into contact with the baffle 60 or the inner surfaces of the portion of the hopper 16 defining the collection chamber 163. Collision of the clippings 198 against the baffle 60 or other surfaces urges the clippings to drop out of the air stream and fall generally toward the bottom panel 45 of the hopper 16 or onto the pile of clippings 198 already accumulated in the hopper 16.

When the stream of air reaches the bottom of the hopper 16 or the pile of clippings collected therein, the stream of air is generally directed upward through the center of the vortex and through the basket 81 and into the exhaust duct 57. Most of any remaining portion of any clippings 198 entrained in the stream of air as it is directed upward are filtered out by the basket 81. The stream of air passes through the exhaust duct 57 to a lower end thereof and passes out of the duct through the first and second vent openings 110 and 111 in the hopper bottom panel 45 and the door bottom panel 92 respectively. As discussed previously, when the door 90 is in the closed position, the sealing flap 114 prevents air in the duct 57 from reentering the collection chamber 63. The deflector plate 112 deflects air discharged through the first set of vent openings 110 downward. By directing the stream of air exiting the duct 57 downward, a minimal amount of discharged clippings, dust and the like reach head height of the operator.

When the collection chamber 63 becomes full, the operator, while remaining seated, can readily dump the contents thereof through manipulation of the dump handle 136 to open the door 90 as discussed previously. The hopper bottom panel 45 is sloped downwardly and rearwardly at a degree sufficient to cause the clippings 198 supported thereon to slide out of the hopper 16 when the door 90 is opened.

It is foreseen that the sloped hopper bottom panel could be replaced by a horizontal surface, provided that the entire collection chamber is hinged to allow tilting and including a mechanism for both tilting the chamber and securing the chamber in a non tilted position when the door 90 is shut.

It is to be understood that while certain forms of the present invention have been illustrated and described herein, it is not to be limited to the specific forms or arrangement of parts described and shown.

What is claimed and desired to be secured by letters patent is as follows:

1. A mower clipping collection system for a riding mower comprising:
   a) a collector housing for collecting clippings having a separation chamber of circular interior horizontal cross-section formed therein and positioned above and opening into a collection chamber of rectangular internal horizontal cross-section formed therein such that clippings in said separation chamber are directed to and collect in said collection chamber and having a generally planar rear wall;
   b) a clipping transfer conduit extending between the mower and the collector housing for transferring clippings blown from the mower to the collector housing; said clipping transfer conduit connected to said collector housing so as to generally tangentially convey clippings to said separation chamber such that clippings blown through said clipping transfer conduit are blown substantially tangentially into said separation chamber and circulate therein in a cyclonic manner; and
   c) a generally planar discharge door mounted in said collection chamber rear wall; said door being selectively moveable between a closed position to maintain clippings in said collection chamber and an open position to allow removal of clippings from said collection chamber.

2. A mower clipping collection system for a riding mower comprising:
   a) a collector housing having an interior cylindrical separation chamber located therein and positioned above and opening into a collection chamber located therein; said separation chamber having a generally cylindrical horizontal cross section and said collection chamber having a generally rectangular horizontal cross section with a generally planar discharge wall; said discharge wall including a clipping discharge opening;
   b) a door selectively moveable in and out of covering relationship with said clipping discharge opening and opening into said collection chamber; and
   c) a clipping transfer conduit extending between the mower and the collector housing for transferring clippings blown from the mower to the collector housing; said clipping transfer conduit connected to said collector housing substantially tangentially relative to said cylindrical separation chamber such that clippings transferred through said clipping transfer conduit are blown substantially tangentially into said separation chamber.

3. The mower clipping collection system as in claim 2 further comprising:
   a. a blower connected to said clipping transfer conduit to facilitate the transfer of clippings through said clipping transfer conduit and into said collector housing.

4. The mower clipping collection system as in claim 3 further comprising:
   a. a clutch for selectively activating said blower.

5. The mower clipping collection system as in claim 4 wherein:
   a. said clutch includes a clutch engagement handle extending proximate a seat of said mower to permit an operator to selectively engage said clutch while seated on the mower.

6. The mower clipping collection system as in claim 3 wherein said clipping transfer conduit comprises:
   a. a blower intake tube extending between an opening in a deck of the mower and said blower; and
   b. a blower discharge tube extending between said blower and said collector housing.

7. The mower clipping collection system as in claim 6 wherein:
   a. said blower discharge tube is rigid and has a rectangular cross-section; and
   b. said blower intake tube is flexible.

8. The mower clipping collection system as in claim 2 wherein:
   a. said collector housing includes a downwardly sloping floor; and
   b. said clipping discharge opening extends upward from near a lower edge of said floor.

9. The mower clipping collection system as in claim 8 further including:
   a. means engageable by an operator seated on the mower seat for advancing said door in and out of covering relationship with respect to the clipping discharge opening in said collector housing.

10. The mower clipping collection system as in claim 2 further including:
    a. an exhaust duct connected to said collector housing in flow communication with an exhaust opening in said collector housing near ground level and having a downwardly directed exhaust duct outlet for discharging a stream of air from said collector housing near ground level.

11. The mower clipping collection system as in claim 10 wherein:

a. said collector housing exhaust opening extends through said collector housing centrally relative to said separation chamber;

b. said exhaust duct extends along said collector housing to proximate a lower end of said collector housing.

12. A mower clipping collection system for a riding mower comprising:

a) a collector housing mountable to a frame of the mower and having opposed sidewalls and a downwardly sloping floor extending between said sidewalls; said collector housing having a collection chamber having a generally rectangular horizontal cross-section formed in a lower section thereof and having a cylindrical wall with a generally cylindrical horizontal cross-section mounted in an upper section thereof and forming a cylindrical separation chamber which is positioned above and opens into said collection chamber; said collection chamber having a wall with a clipping discharge opening positioned therein;

b) a door selectively moveable in and out of covering relationship with respect to said clipping discharge opening; said clipping discharge opening opens to said collection chamber and extends between said sidewalls and upward from a lower edge of said floor; and c) a clipping transfer conduit extending between the mower and the collector housing for transferring clippings blown from the mower to the collector housing; said clipping transfer conduit connected to said collector housing generally tangentially relative to said cylindrical wall such that clippings blown through said clipping transfer conduit are blown generally tangentially into said cylindrical separation chamber through an inlet in said cylindrical wall.

13. The clipping collection system as in claim 12 further comprising:

a. a blower connected to said clipping transfer conduit for blowing clippings through said clipping transfer conduit to said collector housing.

14. The mower clipping collection system as in claim 13 further comprising:

a. a clutch for selectively activating said blower.

15. The mower clipping collection system as in claim 14 wherein:

a. said clutch includes a clutch engagement handle extending proximate a seat of said mower such that an operator may selectively engage said clutch with said clutch engagement handle while seated on the mower.

16. The mower clipping collection system as in claim 12 further including:

a. an exhaust duct connected to said collector housing in flow communication with an exhaust opening in said collector housing and having a downwardly directed exhaust duct outlet located near ground level for discharging exhaust from said collector housing near ground level.

17. The mower clipping collection system as in claim 12 further comprising:

a. a door operating assembly connected to said door and having a handle extending proximate a seat of the mower such that said handle is engageable by a mower operator while seated on the mower seat for moving said door in and out of covering relationship with said clipping discharge opening in said collector housing.

18. A mower clipping collection system for a riding mower comprising:

a) a collector housing mountable to a frame of the mower and having a lower section and an upper section; said collector housing lower section having an interior collection chamber and having opposed sidewalls in a generally rectangular configuration and a downwardly sloping floor extending between said sidewalls; said collector housing lower section having a generally planar wall with a planar discharge opening located in said wall; said collector housing upper section including a cylindrical wall having an interior cylindrical separation chamber with a generally cylindrical horizontal cross-section positioned directly above and in flow communication with said collection chamber;

b) a generally planar door selectively moveable in and out of covering relationship with said clipping discharge opening; said clipping discharge opening opens to said collection chamber and extends between said sidewalls and upward from near a lower edge of said floor;

c) a door operating assembly connected to said door and selectively engageable by a mower operator while seated on the mower seat for moving said door in and out of covering relationship with respect to said clipping discharge opening in said collector housing;

d) a clipping transfer conduit extending between the mower and the collector housing for transferring clippings from the mower to the collector housing;

e) a blower connected to said clipping transfer conduit for blowing clippings through said clipping transfer conduit to said collector housing;

f) a clutch selectively operable by an operator while seated on the mower for selectively activating said blower;

g) said clipping transfer conduit being connected to said collector housing substantially tangentially relative to said cylindrical wall such that clippings blown through said clipping transfer conduit are blown substantially tangentially into said cylindrical separation chamber through an inlet in said cylindrical wall; and h) an exhaust duct connected to said collector housing in flow communication with an exhaust opening in said collector housing near ground level and having exhaust duct outlet for discharging exhaust from said collector housing near ground level.

19. A mower clipping collection system for a riding mower comprising:

a) a collector housing having an interior cylindrical separation chamber located therein and positioned above and opening into a collection chamber located therein;

b) a door selectively moveable in and out of covering relationship with a clipping discharge opening extending across a side of said collector housing and opening into said collection chamber;

c) a clipping transfer conduit extending between the mower and the collector housing for transferring clippings blown from the mower to the collector housing; said clipping transfer conduit connected to said collector housing substantially tangentially relative to said cylindrical separation chamber such that clippings transferred through said clipping transfer conduit are blown substantially tangentially into said separation chamber;

d) said collector housing includes a downwardly sloping floor;

e) said clipping discharge opening extends upward from near a lower edge of said floor;

f) said door is pivotally connected to said collector housing across an upper end of said clipping discharge opening; and g) said mower clipping collection system further includes a door operating assembly connected to said door and having a handle extending proximate the mower seat such that said handle is engageable by a mower operator on the mower seat for advancing said door in and out of covering relationship with respect to said clipping discharge opening in said collector housing.

20. A mower clipping collection system for a riding mower comprising:

a) a collector housing mountable to a frame of the mower and having opposed sidewalls and a downwardly sloping floor extending between said sidewalls; said collector housing having a collection chamber formed in a lower section thereof and having a cylindrical wall mounted in an upper section thereof and forming a cylindrical separation chamber which is positioned above and opens into said collection chamber;

b) a door selectively moveable in and out of covering relationship with respect to a clipping discharge opening; said clipping discharge opening opens to said collection chamber and extends between said sidewalls and upward from a lower edge of said floor;

c) a clipping transfer conduit extending between the mower and the collector housing for transferring blown clippings from the mower to the collector housing; said clipping transfer conduit connected to said collector housing generally tangentially relative to said cylindrical wall such that clippings blown through said clipping transfer conduit are blown generally tangentially into said cylindrical separation chamber through an inlet in said cylindrical wall;

d) an exhaust duct connected to said collector housing in flow communication with an exhaust opening in said collector housing and having a downwardly directed exhaust duct outlet located near ground level for discharging exhaust from said collector housing near ground level;

e) said collector housing exhaust opening extends through said collector housing centrally relative to said separation chamber; and f) said exhaust duct extends along said downwardly sloping floor to proximate a lower end of said downwardly sloping floor.

\* \* \* \* \*